(12) United States Patent
Braun et al.

(10) Patent No.: US 7,365,879 B2
(45) Date of Patent: Apr. 29, 2008

(54) DETERMINING SETS OF N-DIMENSIONAL COLORANT CONTROL SIGNALS

(75) Inventors: Gustav J. Braun, Fairport, NY (US); John R. D'Errico, Alton, NY (US); Kevin E. Spaulding, Spencerport, NY (US); Douglas W. Couwenhoven, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 849 days.

(21) Appl. No.: 10/845,037

(22) Filed: May 13, 2004

(65) Prior Publication Data

US 2005/0254073 A1 Nov. 17, 2005

(51) Int. Cl.
*H04N 1/60* (2006.01)
*G09G 5/02* (2006.01)

(52) U.S. Cl. .................. 358/1.9; 358/518; 382/167; 345/604

(58) Field of Classification Search .......... 358/1.9, 358/501, 502, 504, 518, 523; 382/162, 167; 345/590, 604
See application file for complete search history.

(56) References Cited

U.S. PATENT DOCUMENTS

| | | | |
|---|---|---|---|
| 4,482,917 A | 11/1984 | Gaulke et al. | |
| 5,012,257 A | 4/1991 | Lowe et al. | |
| 5,268,754 A * | 12/1993 | Van de Capelle et al. | 358/527 |
| 5,390,035 A * | 2/1995 | Kasson et al. | 358/518 |
| 5,425,134 A | 6/1995 | Ishida | |
| 5,508,827 A | 4/1996 | Po-Chieh | |
| 5,515,479 A | 5/1996 | Klassen | |
| 5,553,199 A | 9/1996 | Spaulding et al. | |
| 5,563,985 A | 10/1996 | Klassen et al. | |
| 5,583,666 A * | 12/1996 | Ellson et al. | 358/518 |
| 5,633,662 A | 5/1997 | Allen et al. | |
| 5,710,824 A | 1/1998 | Mongeon | |
| 5,857,063 A | 1/1999 | Poe et al. | |
| 6,081,340 A | 6/2000 | Klassen | |
| 6,312,101 B1 | 11/2001 | Couwenhoven et al. | |
| 6,697,520 B1 * | 2/2004 | Hemingway | 382/166 |
| 7,256,912 B2 * | 8/2007 | Chang | 358/1.9 |
| 7,265,870 B2 * | 9/2007 | Velde et al. | 358/1.9 |
| 2002/0105659 A1 | 8/2002 | Rozzi | |

OTHER PUBLICATIONS

International Color Consortium, Specification ICC.1:2001-12 "File Formt For Color Profiles" (version 4.0.0).

* cited by examiner

*Primary Examiner*—Thomas D. Lee
(74) *Attorney, Agent, or Firm*—Raymond L. Owens

(57) ABSTRACT

A method for determining a set of n-dimensional colorant control signals that map to a point P in an m-dimensional color space where n>m, including determining a forward device model that maps n-dimensional colorant control signals to m-dimensional color space signals; determining a set of n-dimensional colorant control signal simplexes that span a domain of the forward device model; and determining a set of range space simplexes in the m-dimensional color space corresponding to the set of n-dimensional colorant control space signal simplexes by mapping the vertices of the n-dimensional colorant control signal simplexes into the m-dimensional color space using the forward device model. The method also includes specifying a point P in the m-dimensional color space; and determining the set of n-dimensional colorant control signals that map to the point P in the m-dimensional color space, by performing m sequential slicing processes through the set of range space simplexes.

15 Claims, 11 Drawing Sheets

DETERMINING SETS OF N-DIMENSIONAL COLORANT CONTROL SIGNALS

CROSS REFERENCE TO RELATED APPLICATIONS

Reference is made to commonly assigned commonly assigned U.S. patent application Ser. No. 10/310,009 filed Dec. 4, 2002 by Gustav J. Braun et al., entitled "Color Gamut Mapping Using a Cost Function", and commonly assigned U.S. patent application Ser. No. 10/309,866 filed Dec. 4, 2002 by Douglas W. Couwenhoven et al., entitled "Calibrating a Digital Printer Using a Cost Function", the disclosures of which are herein incorporated by reference.

FIELD OF THE INVENTION

This invention pertains to digital imaging, and more particularly to producing color control signals for use in producing a color digital image.

BACKGROUND OF THE INVENTION

A typical digital imaging system can include an image capture device such as a digital camera or scanner, a computer attached to the digital camera for processing the digital images, and an output device such as a color printing device or softcopy display attached to the computer for printing/viewing the processed digital images. A color management architecture for a digital imaging system provides a way for processing the digital images in the computer such that the output colors that are produced on the output device are reasonable reproductions of the desired input colors as captured by the input device. One such color management architecture that is widely known and accepted in the art is defined by the International Color Consortium (ICC) in Specification ICC.1:2001-12 "File Format For Color Profiles". The ICC color management framework provides for characterizing an imaging device using a device profile such as an "ICC profile". The ICC profile for an imaging device specifies how to convert from device dependent color space (DDCS) to a device independent color space (DICS) so that images can be communicated from one device to another. The ICC color management paradigm is well known in the art.

For example, images produced by a digital camera are generally composed of a 2-dimensional (x,y) array of discrete pixels, where each pixel is represented by a trio of 8-bit digital code values (which are integers on the range 0-255) that represent the amount of red, green, and blue color that were "seen" by the camera at this pixel. These RGB code values represent the DDCS, since they describe the amount of light that was captured through the specific set of RGB filters that are used in the digital camera. In order for this digital image to be color-managed to another color imaging device, the RGB code values are generally transformed into a DICS. Once in a DICS such as 1976 CIE L*a*b* color space (i.e., CIELAB), image pixel values can be converted to DDCS values for an output color printing device such as a color inkjet printer that utilizes cyan (C), magenta (M), yellow (Y), and black (K) colorants. The transformation that converts the DICS values to DDCS values for a given output device is referred to herein as an inverse device model. For color imaging devices that utilize more than three colorants, many DDCS values can map to a single DICS value. This case represents a many-to-one mapping for which a unique inverse device model does not exist.

The ICC profile format, of course, simply provides a file format in which a color transform (i.e., a color management profile) is stored. The color transform itself, which is typically encoded as a multidimensional look-up table, is what specifies the mathematical conversion from one color space to another. There are many tools known in the art, such as the commercially available Kodak ColorFlow Profile Editor, for producing ICC profiles for wide variety of imaging devices, including inkjet printers using CMYK colorants. CMYK printers in particular pose a challenge when producing a color transform. Since there are four colorants that are used to print a given color, which is specified in the DICS by three channels (e.g., CIELAB L*a*b* values), then there is an extra degree of freedom that results in a many to one mapping, where many CMYK code value combinations can result in the same color. Thus, when building the color transform, a method of choosing a particular CMYK combination that is used to reproduce a given color is required.

Techniques to accomplish this, known in the graphic arts as Under Color Removal (UCR) or Black Generation (BG), are known in the art, as taught in U.S. Pat. Nos. 4,482,917; 5,425,134; 5,508,827; 5,553,199; and 5,710,824. These methods primarily use smooth curves or interpolation techniques to specify the amount of K ink that is used to reproduce a color based on its location in color space, and then compute the amount of CMY ink that is needed to accurately reproduce the color.

However, in the case of an inkjet printer, which places discrete drops of CMYK inks on a page, different combinations of CMYK code values can produce the same color, but appear much different in graininess or noise when viewed by a human observer. This is due to the fact that inkjet printers are typically multitone printers, which are capable of ejecting only a fixed number (generally 1-8) of discrete ink drop sizes at each pixel. The graininess of a multitoned image region will vary depending on the CMYK code values that were used to produce it. Thus, certain CMYK code value combinations might produce visible patterns having an undesirable grainy appearance, while other CMYK code value combinations can produce the same (or nearly) color, but not appear as grainy. This relationship is not recognized nor taken advantage of in the prior art techniques for producing color transforms for CMYK printers.

An additional complication with producing color transform for inkjet printers is that image artifacts can typically result from using too much ink. These image artifacts degrade the image quality, and can result in an unacceptable print. In the case of an inkjet printer, some examples of these image artifacts include bleeding, cockling, banding, and coalescence. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver can warp to such an extent as to interfere with the mechanical motions of the printer, potentially causing damage to the printer. Banding refers to unexpected dark or light lines or streaks that appear running across the print, generally oriented along one of the axes of motion of the printer. Coalescence refers to undesired density or tonal variations that arise when ink pools together on the page, and can give the print a grainy appearance, thus degrading the image quality. In an inkjet printer, satisfactory density and color reproduction can generally be achieved without using the maximum possible amount of colorant. Therefore, using excessive colorant not only introduces the possibility of the above described image artifacts occurring, but is also a waste of colorant. This is disadvantageous, since the user will obtain fewer prints from a given quantity of colorant.

It has been recognized in the art that the use of excessive colorant when printing a digital image needs to be avoided. Generally, the amount of colorant needed to cause image artifacts (and therefore be considered excessive) is receiver, colorant, and printer technology dependent. Many techniques of reducing the colorant amount are known in the art, some of which operate on the image data after multitoning. See, for example, U.S. Pat. Nos. 4,930,018; 5,515,479; 5,563,985; 5,012,257; and 6,081,340. U.S. Pat. No. 5,633,662 to Allen et al. teaches a method of reducing colorant using a pre-multitoning algorithm that operates on higher bit precision data (typically 256 levels, or 8 bits per pixel, per color). Also, many of the commercially available ICC profile creation tools (such as Kodak ColorFlow Profile Editor) have controls that can be adjusted when producing the ICC profile that limit the amount of colorant that will be printed when using the ICC profile. This process is sometimes referred to as total colorant amount limiting.

The prior art techniques for total colorant amount limiting work well for many inkjet printers, but are disadvantaged when applied to state of the art inkjet printers that use other than the standard set of CMYK inks. A common trend in state of the art inkjet printing is to use CMYKcm inks, in which additional cyan and magenta inks that are lighter in density are used. The light inks are similar to their darker counterparts in that they produce substantially the same color but different density. The use of the light inks results in less visible ink dots in highlight regions, and therefore improved image quality. However, many tools for producing ICC profiles cannot be used to produce a profile that directly addresses all six color channels of the inkjet printer, due to the complex mathematics involved. Instead, a CMYK profile is typically produced, which is then followed by a look-up table that converts CMYK to CMYKcm. For example, see U.S. Pat. No. 6,312,101. While this and similar methods provide a way for current ICC profile generation tools to be used with CMYKcm printers, the amount of colorant that gets placed on the page as a function of the CMYK code value is typically highly nonlinear and possibly non-monotonic as well. This produces a problem when using the prior art ICC profile generation tools, since they all assume that the amount of colorant that is printed is proportional to the CMYK code value. Thus, when building an inverse device model and an ICC profile for a CMYKcm printer using prior art tools, the total colorant amount limiting is often quite inaccurate, resulting in poor image quality.

Prior art processes that utilize UCR approaches to direct the use of black in the printing process are not suitable for color printing process that utilize alternative colorants such as CMYK in addition to orange (O) and green (G). Prior art process such as that described by Gregory et al., U.S. Pat. No. 5,857,063, use UCR as a mechanism to transform the 3-to-4 dimensional problem of producing an inverse model for a CMYK printer to a 3-to-3 dimensional problem. In this case direct inversion processes exist for the cases where the black colorant is added according to a UCR equation. However, this process has many limitations when it comes to building a colorimetric inverse device model. The UCR strategy has a tendency to reduce the gamut of the color printing device as well as limiting certain colorant combinations from ever being formed.

In general, it takes very sophisticated processes to produce an inverse device model for a CMYKOG printing system. As previously recognized, the conversion from the 3-dimensional color space such as CIELAB to DDCS colorant control signals such as CMYK represents and ill-posed mathematical problem (i.e., there can exist many CMYK values that map to a single CIELAB point). The ill-posed nature of the problem increases when two extra dimensions are added to the problem, namely orange (O) and green (G) colorants. Under color removal processes that direct the usage of black are no longer suitable to reduce the dimensionality of the inverse model generation process to a 3-to-3 dimensional problem. As such, this represents a limitation of a UCR-like approach for more than four colorant inverse device-modeling processes.

This phenomenon is not limited to CMYK processes that add in extra inks such as orange and green. In general, any mapping from a m-dimensional color space to a n-dimensional colorant control signal space, where n is greater than m, represents an ill-posed problem. For cases where n is greater than four, methods designed after a UCR-like process that try and fix the amount of one colorant according to a set of rules to reduce the dimensionality of the process to a 3-to-3 dimensional conversion do not work.

In U.S. Patent Application Publication 2002/0105659 A1, W. A. Rozzi teaches a process for producing an inverse printer model using a 3-dimensional root finding approach. Their process fixes one of the colorant control signal channels to a set level and then solves for a set of the other 3 colorant values that produce the desired color space value. This problem requires a solution of a nonlinear system of equations, which is a 3-dimensional root finding problem. This 3-to-3 mapping can have zero, one, or more than one solution. Rozzi considers the cases of zero solutions and of exactly one solution, but fails to deal with the problem of when there is more than one solution. This is a limitation of the Rozzi process.

Yet another limitation of the Rozzi process is in how it deals with the infinite set of possible colorant control values for a given color. This leaves these colors as simply a set of independent points. They are not treated as a connected set in the n-dimensional colorant control space. This makes selection of the optimal point from the independent set of points problematic. As such, there is a need for a process that can determine the set of all n-dimensional colorant control signal values that map to an m-dimensional color space value where the relationship between the n-dimensional colorant control signal values is known.

SUMMARY OF THE INVENTION

In light of the above described limitations, there is the need for a color transformation used in preparing a digital image for a digital printer in which the amount of colorant, the noise (or graininess), and the color reproduction accuracy can be simultaneously adjusted by a user that is general for an n colorant printing device.

It is an object of the present invention to provide colorant control signals which, when combined, provide a color transformation that can used to make color digital images in an efficient manner.

This object is achieved by a method for determining a set of n-dimensional colorant control signals that map to a point P in an m-dimensional color space, comprising, where n>m, comprising:

a) determining a forward device model that maps n-dimensional colorant control signals to m-dimensional color space signals in the m-dimensional color space;

b) determining a set of n-dimensional colorant control signal simplexes that span a domain of the forward device model;

c) determining a set of range space simplexes in the m-dimensional color space corresponding to the set of n-dimensional colorant control space signal simplexes by mapping the vertices of the n-dimensional colorant control signal simplexes into the m-dimensional color space using the forward device model;

d) specifying a point P in the m-dimensional color space; and e) determining the set of n-dimensional colorant control signals that map to the point P in the m-dimensional color space, by performing m sequential slicing processes through the set of range space simplexes.

ADVANTAGES

A feature of the present invention is that an inverse device model can be produced for an n colorant system without using UCR or BG techniques to reduce the dimensionality of the inversion process in order to produce a one-to-one mapping between the colorant domain and color space. According to the present invention, a set of n-dimensional color control signal values can be determined that all map to a point P in an m-dimensional color space. This process is achieved directly without complicated nonlinear optimization or iteration processes. The present invention is possible for systems that employ any number (n) of colorants. This process can be used to produce an inverse device model for a color printing device that can be used to produce a color management profile to control the printing characteristics of the color printing device.

DETAILED DESCRIPTION OF THE INVENTION

Figure 1A:
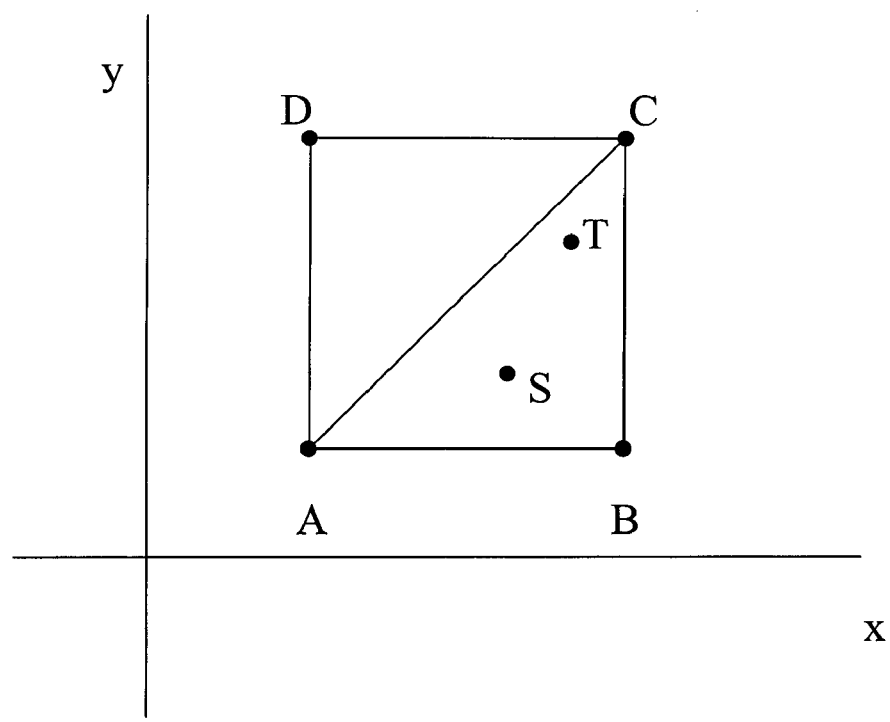
FIG. 1A is a graph illustrating a two-dimensional simplicial complex.

A general method is given for producing a color space transformation for a digital printing system that converts m-dimensional color space signals to n-dimensional colorant control signals, where n is greater than m. This process includes the step of first determining a set of n-dimensional colorant control signals that map to a particular m-dimensional color space signal P in the m-dimensional color space. This process further includes using a cost function to select an n-dimensional colorant control signal from the set of n-dimensional colorant control signals that map to the point P, where the cost function can include cost terms associated with attributes that can impact image quality, such as graininess (image noise) or total ink volume. This process can be used to produce inverse device models for color printing devices or color display devices. A preferred embodiment of the present invention achieving these goals is provided herein. The invention will be described in the context of producing a transformation from a 3-dimensional color space (e.g., the 1976 CIE L*a*b* or CIELAB uniform color space) to a 4-dimensional colorant control signal space (e.g., CMYK device code values for a color printing device) simultaneously controlling the color reproduction, total colorant amount, and graininess, but one skilled in the art will recognize that the scope of the invention is not limited to this arrangement, and can be applied to other colorant sets and/or other printing and/or display technologies as well.

A color transformation that converts signals from an n-dimensional colorant control signal space to m-dimensional color space signals in an m-dimensional color space is referred to herein as a forward device model. For digital color printing devices, color space transformations that convert m-dimensional color space signals to n-dimensional colorant control signals are referred to herein as inverse device models. For the case where n is greater than m, it is not possible to determine the inverse device model by directly inverting the forward device model because there will generally be a many-to-one mapping in the forward model. For example, a CMYK inkjet printer will have colorant control signals corresponding to cyan (C), magenta (M), yellow (Y), and black (K) colorants. For such CMYK color printing devices, multiple CMYK colorant control signals can produce the same CIELAB value.

For the case where n is greater than m, the present invention provides a method for determining the set of n-dimensional colorant control signals that map to a point P in the m-dimensional color space by determining a set of (n−m) dimensional simplexes, in the colorant control signal space, that map to the point P. Additionally, the present invention provides a mechanism to select a preferred n-dimensional colorant control signal from the set of n-dimensional colorant control signals that map to the point P. This process can be used for a plurality of points P to form an inverse device model.

The term simplex refers to a set of (d+1) points (or vertices) in a d-dimensional space and all of the points contained on or in a convex hull of the vertices. The term convex hull refers to the minimal envelope encompassing a set of vertices. Referring to FIG. 1A, there is shown a two-dimensional graph which is used to illustrate these terms, where it will be obvious to one skilled in the art that these definitions can be extended to higher or lower dimensional spaces. Still referring to FIG. 1A, the triangle formed by vertices A, B, and C form a simplex in a 2-dimensional domain space. (The dimensions of the 2-dimensional domain space are labeled x and y.) Simplex ABC is referred to as a 2-plex (i.e., indicating that it is a two dimensional simplex). The perimeter of the triangle (formed by points A, B, and C) is the convex hull of the vertices A, B, and C. All [x,y] points that fall inside the triangle or are on the perimeter are members of the convex set spanned by the simplex ABC. This definition of simplex, convex sets, and convex hulls extends to higher or lower dimensional spaces where triangles are replaced by higher order geometric shapes.

Still referring to FIG. 1A, the simplexes ABC and ACD together form a simplicial complex. As referred to herein, a simplicial complex is a set of simplexes whose only intersections are at their perimeters. All of the simplexes in the complex have the same order, k=2 (i.e., they are all 2-plexes).

For the purposes of this invention it is useful to consider the concept of embedding a lower dimensional simplex in a higher dimensional space. Still referring to FIG. 1A, the line segment connecting points A and B (AB) can be considered a 1-dimensional simplex (i.e., a 1-plex) in the 2-dimensional [x,y] coordinate system. Another example of embedding a lower dimensional simplex in a higher dimensional space is a triangle in a 3 dimensional space. In the case of an n colorant color printing device, an m-dimensional color space value P will map to an (n–m) dimensional simplicial complex in the n-dimensional colorant control signal space. For example, for a well-behaved three-color printing device, such as a CMY inkjet printer, an in-gamut CIELAB color space value will map to a single CMY colorant control signal value. In this case, n=3 and m=3, so that the (n–m) dimensional set of colorant control signal values will be a single point, i.e., a 0-plex. For the case of a well-behaved CMYK printing system, an in-gamut CIELAB color space value can map to a number of CMYK colorant control signal values. In this case, n=4 and m=3, so that the (n–m) dimensional set of colorant control signal values will be a simplicial complex comprised of a set of 1-plexes.

The present invention provides a method of producing an inverse device model comprising the steps of identifying a unique n-dimensional colorant control signal for each m-dimensional point in the inverse device model by determining the set of n-dimensional colorant control signals, i.e. the set of (n–m) dimensional simplexes, that correspond to a given m-dimensional point, and then utilizing a cost-function-based colorant selection process to select the preferred point from the set.

For purposes of illustrating a forward device model (F) that maps the n-dimensional colorant control signals into m-dimensional color space signals, consider the case where the n-dimensional colorant control signals comprise the four colorants of a CMYK color printing device, i.e. cyan (C), magenta (M), yellow (Y), and black (K), and the m-dimensional color space signals comprise CIELAB color space values (i.e., L*, a* and b*). The process of producing the forward device model generally includes the steps of printing a plurality of color patches corresponding to set of CMYK colorant control signals, measuring the CIELAB color space values using a color measurement device such as a spectrophotometer, and fitting a four-to-three dimensional look-up table to the data. In a preferred embodiment of the present invention, a forward device model can be determined using the process taught by D'Errico in U.S. Pat. No. 4,992,861. This method involves using a least-squares technique to produce a forward device model from the measured color patch data. It will be understood by one skilled in the art that there are many other methods that could be used to build a forward device model.

Given a forward device model (F), a simplicial complex comprised of a set of n-dimensional colorant control space signal simplexes are produced using an n-dimensional tessellation process to form an n-dimensional simplicial complex in the n-dimensional colorant control signal space. Generally the set of n-dimensional colorant control space signal simplexes are produced in such a manner so as to fully span the colorant control signal domain space.

For a three-dimensional colorant control signal space, such as a cyan (C), magenta (M), yellow (Y) colorant inkjet printer, simplexes will comprise four vertices. These four-vertex simplexes, i.e. 3-plexes, are referred to herein as tetrahedron. In this case, the simplicial complex produced using the tessellation process would be comprised of a set of tetrahedra that span the CMY colorant control signal space. In another example, a four colorant inkjet printer will have colorant control signal space simplexes that have five vertices, i.e., 4-plexes.

Figure 1B:
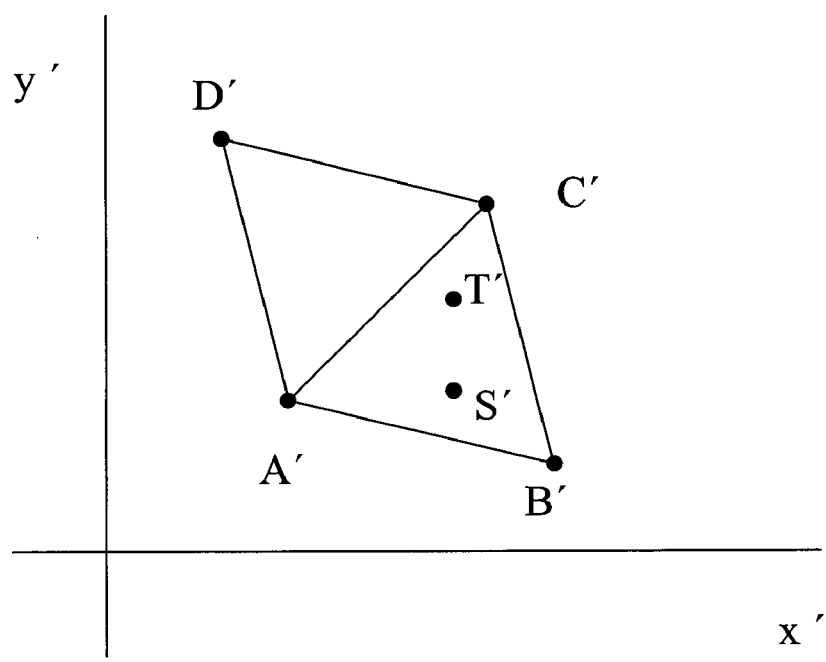
FIG. 1B is a transformation of the coordinate system shown in FIG. 1A.

Referring to FIG. 1B, consider the case where the domain space colorant control signals A, B, C, and D from FIG. 1A are transformed to an (m=2) dimensional range color space [x',y'] using a forward device model (F) to produce corresponding (m=2) dimensional points A', B', C', and D'. The range space points A', B', C', and D', determined by applying the forward device model (F) to the corresponding domain space points, are referred to herein as the ranges of domain space points A, B, C, and D, respectively. Still referring to FIG. 1B the [x,y] domain space point A (from FIG. 1A) is transformed to the range space point A' in the [x',y'] space. The simplexes A'B'C' and A'C'D' are ranges of the domain space simplexes ABC and ACD in FIG. 1A. Simplexes A'B'C' and A'C'D' form a simplicial complex in the range space. If the forward device model (F) used to map A, B, C, and D to A', B', C', and D' is a one-to-one mapping, then a point that falls in a given domain space colorant control signal simplex will fall in the corresponding range space color space simplex.

Referring to FIG. 1A, consider the transformation of the domain space point S to its corresponding range space S' in FIG. 1B using a linear interpolation method. An example linear interpolation method uses barycentric weights on the vertices of the simplex that contains point S. The barycentric weights $[w_A, w_B, w_C]$ for point S are given by the areas of triangles BSC, ASC, and ASB relative to the area of triangle ABC respectively. The areas of the triangles are computed by $$Area_{ABC} = \frac{\begin{vmatrix} B_x - A_x & C_x - A_x \\ B_y - A_y & C_y - A_y \end{vmatrix}}{2!}$$

where ‖ represents the determinant of the matrix contained within and the "!" symbol refers to the factorial operator. Similar expressions are used to compute the areas (Area$_{BSC}$, Area$_{ASC}$, and Area$_{ASB}$) of triangles BSC, ASC, and ASB. The barycentric weights [w$_A$, w$_B$, w$_C$] are calculated as the ratio of areas $$w_A = \frac{Area_{BSC}}{Area_{ABC}},$$
$$w_B = \frac{Area_{ASC}}{Area_{ABC}},$$
$$w_C = \frac{Area_{ASB}}{Area_{ABC}}.$$

Thus, the linear interpolated range space point S' is produced by $$S'=w_A \cdot A'+w_B \cdot B'+w_C \cdot C'.$$

In this example the domain space point S was mapped to a point S' in the range space using an interpolation techniques designed to linearly approximate the forward model (F). Likewise, a linear approximation of the inverse of the forward model (F$^{-1}$) can be made for point T' in the range space that maps to a corresponding point T in the domain space using barycentric coordinates derived from the range space vertices in a manner consistent with the previous example. This process is valid provided the dimensionality of the range and the domain space are equal.

For cases where the dimensionality of the n-dimensional colorant control signal space (a domain space) is greater than the dimensionality of the m-dimensional color space (a range space), there exists a many-to-one mapping of the n-dimensional colorant control signals into the m-dimensional color space. For example, consider the case of an (n=2) dimensional colorant control signal space including two colorants: colorant (x1); and colorant (x2). Also, consider the case where the forward device model maps the x1 and x2 colorant control signals to an (m=1) dimensional color space defined by z using the relationship $$z=x1^2+x2^2.$$

Figure 2:
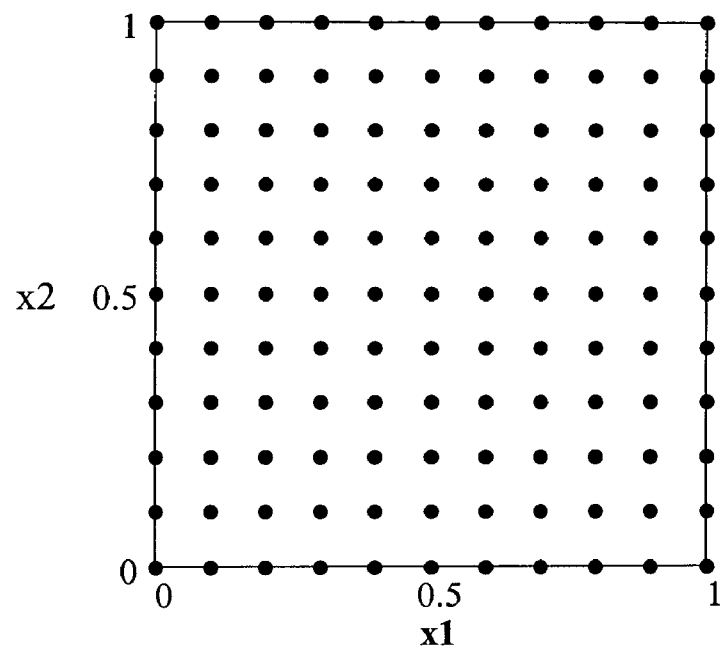
FIG. 2 depicts a grid of colorant control signal values that span the domain of the colorant control signals x1 and x2.

Consider the case where it is desired to know all of the x1 and x2 colorant combinations that map to a point z=0.8 in the 1-dimensional color space of z. This can be accomplished by determining the intersection of a hyperplane z=0.8 with the range of a simplicial complex of the [x1, x2] colorant control signal under the forward device model (F). A simplicial complex of the [x1, x2] colorant control signal domain can be determined by, first, defining a grid of [x1, x2] colorant control signal domain points, as shown in FIG. 2, that spans the colorant control signal space of zero to one. Next, this grid, or lattice, of points is tessellated using a triangulation process to produce a (n=2) dimensional colorant control signal space simplicial complex, as shown in FIG. 3.

As referred to herein, a tessellation of a set of points is a division of the region-of-interest spanned by the points such that the division forms a set of non-overlapping simplexes, i.e. a simplicial complex, where all of the vertices of said simplexes are members of the original point set. In addition, this simplicial complex must contain all points in the original point set. By definition this tessellation completely covers the region-of-interest. For the purposes of this invention it is not pertinent how this tessellation was derived. It is sufficient that one exits.

Figure 3:
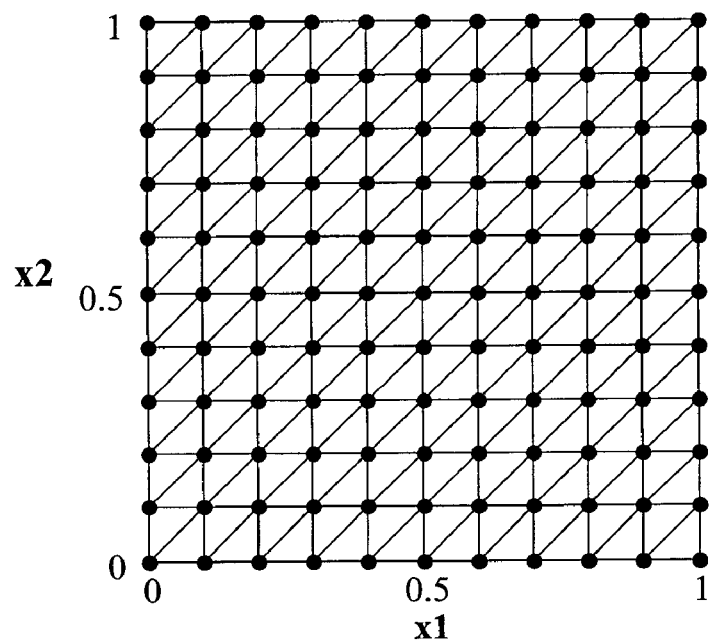
FIG. 3 is similar to FIG. 2 except that the points in FIG. 2 are connected as a simplicial complex.
Figure 4:
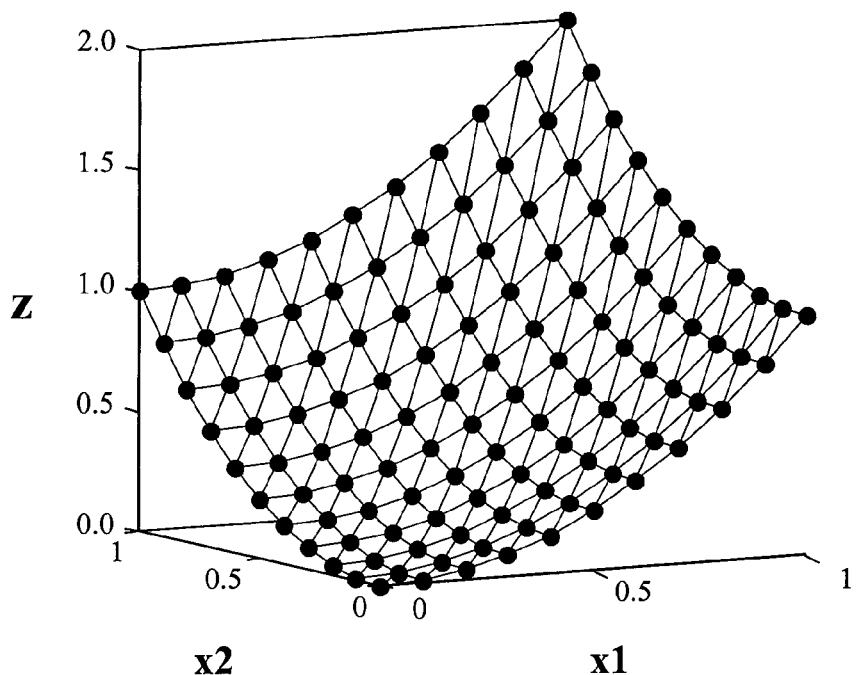
FIG. 4 is a three-dimensional plot that uses the simplicial complex of FIG. 3 to depict the relationship between the range space points (z) and the domain space points (x1 and x2)

Still referring to FIG. 3, the [x1, x2] vertices of the (n=2) dimensional colorant control signal space simplicial complex are transformed to the range space (i.e., the (m=1) dimensional (z) color space) using the forward device model (F) to form a corresponding set of range spaces simplexes, i.e., a range space simplicial complex. This process and the resultant range space simplicial complex can be visualized as shown in FIG. 4. Still referring to FIG. 4, the (m=1) dimensional color space signals for all of the points in the (n=2) dimensional colorant control signal space values are readily visible in the figure as the height (z value) of the point above the [x1, x2] plane.

Figure 5:
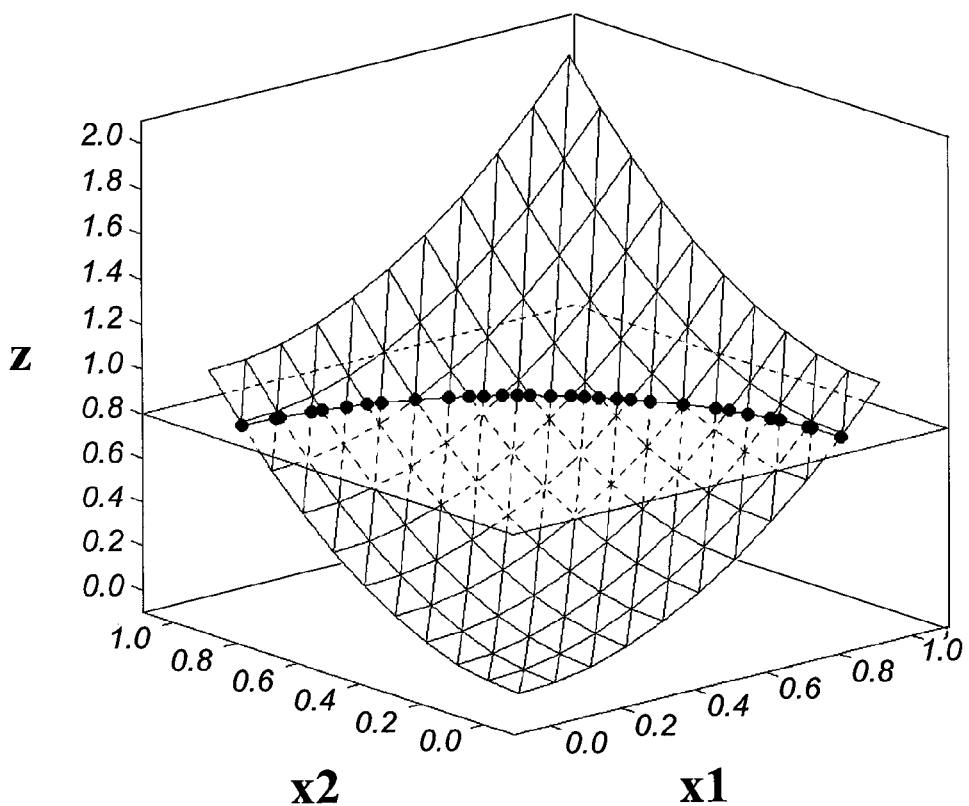
FIG. 5 depicts a slice through the FIG. 4 plot at a constant range space value specifying the point P=0.8 in the 1-dimensional color space (z)

The goal was to determine the set of x1 and x2 colorant combinations that produced a color space value of z=0.8. This goal is met, according to the present invention, by determining a set of (n–m) dimensional colorant control signal space simplexes, in the n-dimensional colorant control signal space, that map to z=0.8 in the m-dimensional color space, by performing m sequential slices in the m-dimensional color space through the set of range space simplexes. In a preferred embodiment of the present invention, this slicing process includes determining the intersection of a surface, e.g. a hyperplane, in the m-dimensional color space and the edges of the set of range space simplexes in the m-dimension color space. This process is graphically illustrated in FIG. 5, whereby a z=0.8 plane is shown to intersect with the set of range space simplexes.

Figure 6:
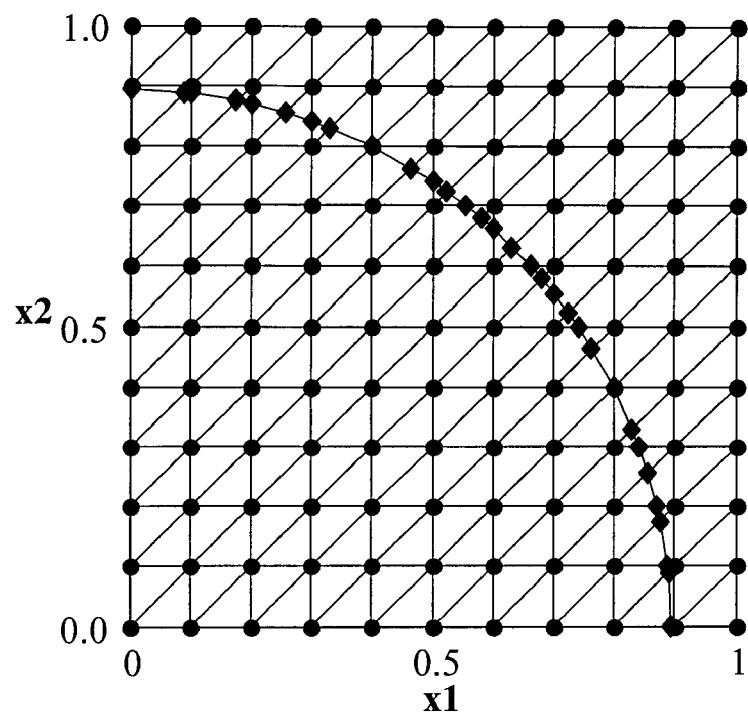
FIG. 6 is a plot depicting the set of n-dimensional points in the (x1, x2) domain that map to the point P=0.8 in the m-dimensional color space of z superimposed over the plot shown in FIG. 3.

The set of points [x1, x2] that map to z=0.8 is determined by identifying the edges of the domain space simplexes that correspond to the edges of the range spaces simplexes that intersect with the z=0.8 plane. This can be done by testing each domain space simplex to determine if any of the edges of the corresponding range space simplex intersect the z=0.8 level. For a given range space simplex whose edges or vertices cross the z=0.8 level there will be at least one point, and at most two points, that cross the level. In the case of a single point intersection (i.e., a trivial case) one of the vertices of the simplex mapped to the z=0.8 level value. For cases where two edges interest, i.e. a non-trivial case, the points of intersection are connected to form a 1-plex in the [x1, x2] domain space. The set of 1-plexes formed above constitute a simplicial complex in the domain space. As referred to herein, this simplicial complex of 1-plexes is known as a 1-manifold embedded in the 2-dimensional domain space. This 1-manifold defines a piecewise linear set approximating the mapping from the range space level of z=0.8 to domain space colorant control signal values x1 and x2. Referring to FIG. 6, the diamonds represent colorant control signal values, in the domain space, that map to z=0.8 in the range space. These points all lie along edges, or at a vertex, of some given simplex in the domain space simplicial complex.

As referred to herein, a k-manifold in a d-dimensional domain space defines a piece-wise linear approximation to a mapping of a range space region-of-interest, e.g. point, line, plane, or hyperplane, to the domain space for the inverse of the forward device model defined by F. As referred to herein, this inverse mapping of the forward device model F is an inverse device model ($F^{-1}$).

Figure 7:
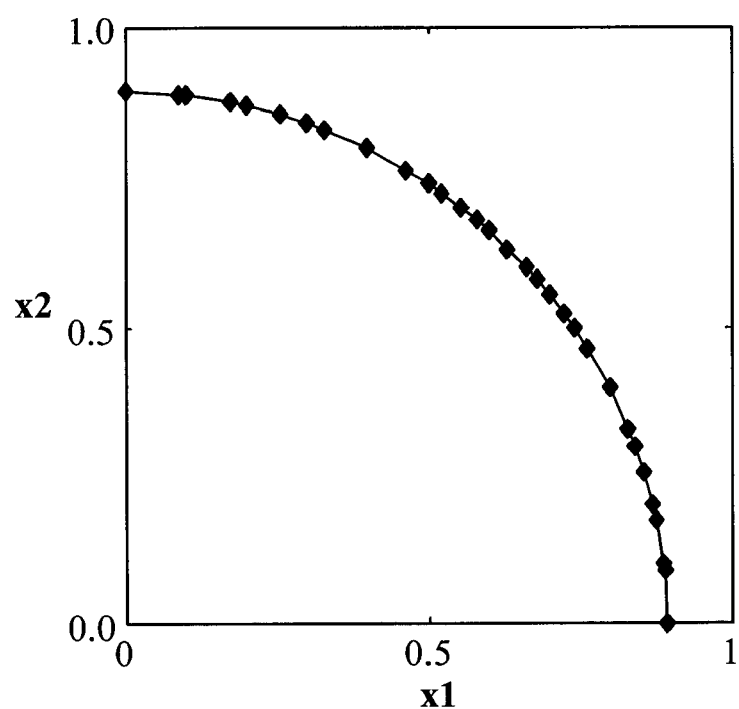
FIG. 7 is the set of n-dimensional points in the (x1, x2) domain that map to the point P shown in FIG. 6 connected as a 1-manifold.

Referring to FIG. 7, in the previous example, if the only criterion for selecting colorant control signal values [x1, x2] was that the combination needed to map to z=0.8, any colorant combination falling along the piecewise linear 1-manifold, i.e. the line segments connecting the diamonds, would suffice. In the case of many real-world systems some preference can be assigned to different combinations of colorants. In the case of an inkjet printing system, this preference could be based on the total fluid volume of the colorant combinations or the perceived noise resulting from printing colorants together. In general, a colorant selection process can be used to select a preferred colorant control signal value from the manifold. In a preferred embodiment of the present invention, the colorant selection process involves the reduction of a "cost function" incorporating one or more factors relating to the quality/desirability of the candidate colorant combinations.

The previous example was given to illustrate a process where a 2-dimensional colorant control signal domain space was mapped to a 1-dimensional color range space. Now consider the case of a color printing device that utilizes four colorants, [x1=C, x2=M, x3=Y, x4=K], and has a forward device model (F) that defines the mapping of the 4-dimensional colorant control signal domain to a 3-dimensional color space such as the CIELAB color space. In this example, the input colorant control signal space is an (n=4) dimensional domain space and the output color space is a (m=3) dimensional range space.

In this example, the forward device model (F), that maps domain space [x1, x2, x3, x4] colorant control signal values to CIELAB color space values, is a many-to-one mapping. As such, it is not directly invertible. Thus, for any point P in the CIELAB range space, that is inside the range of the forward model F, there exists a set of colorant control signals (in this case a 1-mainfold) that maps to point P in the range space (Note: for some points the 1-manifold can degenerate to a single domain space point, i.e., a 0-manifold).

Colors in the CIELAB range space that are within the range of the forward device model F will map to a corresponding 1-manifold of domain space colorant control signal values. A procedure for determining this manifold is provided by the present invention. For a four-colorant imaging system, the forward device model (F) is defined by a domain space simplicial complex including 4-plexes (i.e., simplexes with 5 vertices). Each vertex of the forward model is associated with a range space CIELAB color space value.

This is directly analogous to two-dimensional colorant control signal case previously cited that comprised a domain space simplicial complex of 2-plexes, i.e. triangles, and their associated 1-dimensional color space range value (z). Linear interpolation using barycentric weights permitted for domain space points to be converted to range space points under the forward model (F). In the current case, the mechanism for converting the 4-dimensional colorant control signal values to the 3-dimensional color space values is linear interpolation using barycentric coordinates. The equations used to calculate the barycentric weights [w1, w2, w3, w4, w5] are given by $$\begin{bmatrix} w1 \\ w2 \\ w3 \\ w4 \\ w5 \end{bmatrix} = \begin{bmatrix} x11 & x12 & x13 & x14 & x15 \\ x21 & x22 & x23 & x24 & x25 \\ x31 & x32 & x33 & x34 & x35 \\ x41 & x42 & x43 & x44 & x55 \\ 1 & 1 & 1 & 1 & 1 \end{bmatrix}^{-1} \cdot \begin{bmatrix} d1 \\ d2 \\ d3 \\ d4 \\ 1 \end{bmatrix}.$$

Thus, linear interpolation comprises the steps of applying these weights to the range space color space values (Lab1, Lab2, Lab3, Lab4, Lab5)

$$\begin{bmatrix} L \\ a \\ b \end{bmatrix} = \begin{bmatrix} L1 & L2 & L3 & L4 & L5 \\ a1 & a2 & a3 & a4 & a5 \\ b1 & b2 & b3 & b4 & b5 \end{bmatrix} \cdot \begin{bmatrix} w1 \\ w2 \\ w3 \\ w4 \\ w5 \end{bmatrix}.$$

The present invention provides a method for determining the mapping of an in-gamut range space point P, i.e., a point P that resides in the range of the forward model F, in the m-dimensional color space, to corresponding n-dimensional colorant control signal space values using a process that includes performing m sequential slices through the range of the domain space simplicial complex. This sequential slicing process results in a (n–m)-dimensional manifold of n-dimensional colorant control signal domain space values that all map to the CIELAB range space point P.

Figure 8:
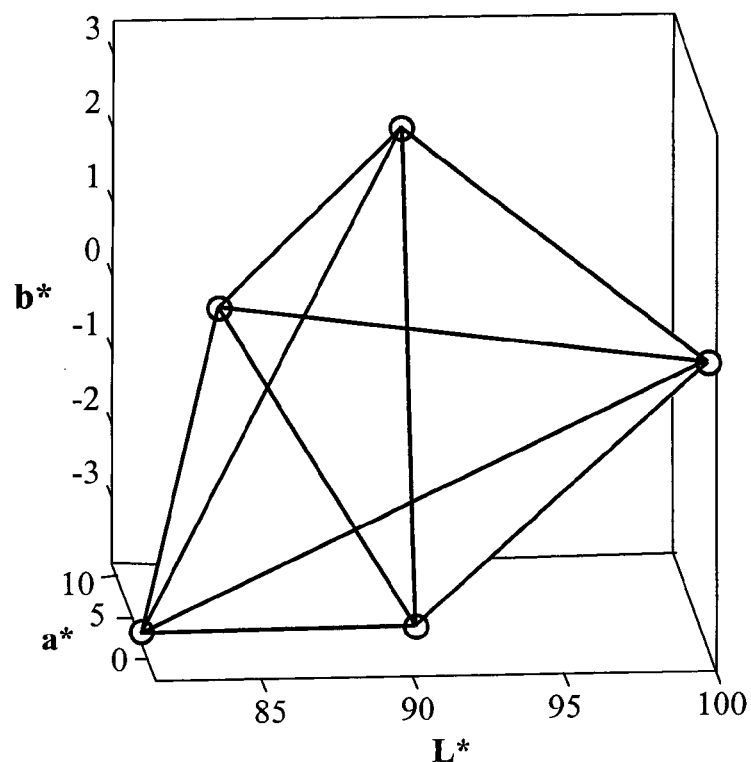
FIG. 8 is the range of the domain space simplex that contains a point P in the m-dimensional color space.

For the four-colorant case, the domain space simplicial complex is comprised of a set of 4-plexes. FIG. 8 shows a range space simplex formed by mapping one 4-dimensional colorant control signal simplex into the CIELAB range space using the forward device model. The range space simplex is comprised of 5 vertices in the range space. These 5 vertices are connected using the same tessellation scheme, or connectivity list, as the corresponding domain space simplex. The goal is to determine the set of domain space points that map to the point P in the range space. Therefore, consider a range space point P that lies within the range space simplex shown in FIG. 8. In order to determine the points in the domain space that map to point P in the 3-dimensional range space (m=3), sequential slices are taken through the range space simplex containing point P.

Figure 9:
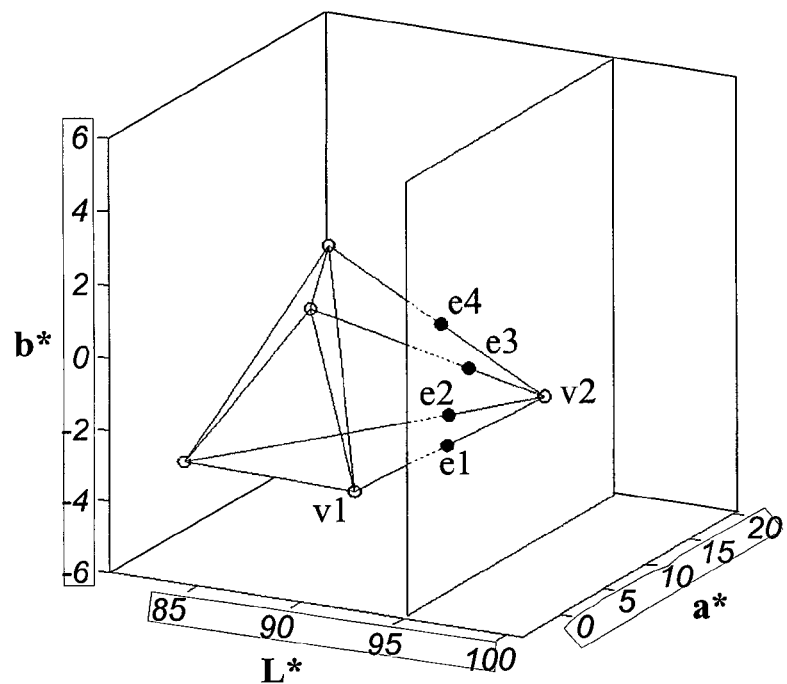
FIG. 9 is similar to FIG. 5 except that it is a slice taken through a point P contained within the simplex of FIG. 8.

The slicing process comprises the steps of defining 3 surfaces, generally hyperplanes, in the (m=3)-dimensional CIELAB color space that pass through point P, and whose only common point of intersection is at the point P. Given that point P lies within the range space simplex corresponding to the current domain space simplex, the 3 hyperplanes will, necessarily, intersect the edges or the vertices of the range space simplex. The drawing given in FIG. 9 shows a single m-dimensional hyperplane that intersect point P for an L* value of 95. This hyperplane intersects four edges of the range space simplex resulting in 4 intersection points [e1, e2, e3, e4]. These four intersection points [e1, e2, e3, e4] define a corresponding 4-plex in the domain space. In general, a slicing hyperplane that intersects the range space simplex corresponding to a domain space 5-plex will intersect either four or six edges resulting in either four or six intersection points, respectively. Other degenerate cases exist where the slicing plane passes through one or more of the vertices of the range space simplex. The method of the present invention covers these cases as well. For the cases where the number of intersection points is greater than four, the resulting tessellation of these points comprises a complex of 4-plexes rather than a single 4-plex.

Figure 10:
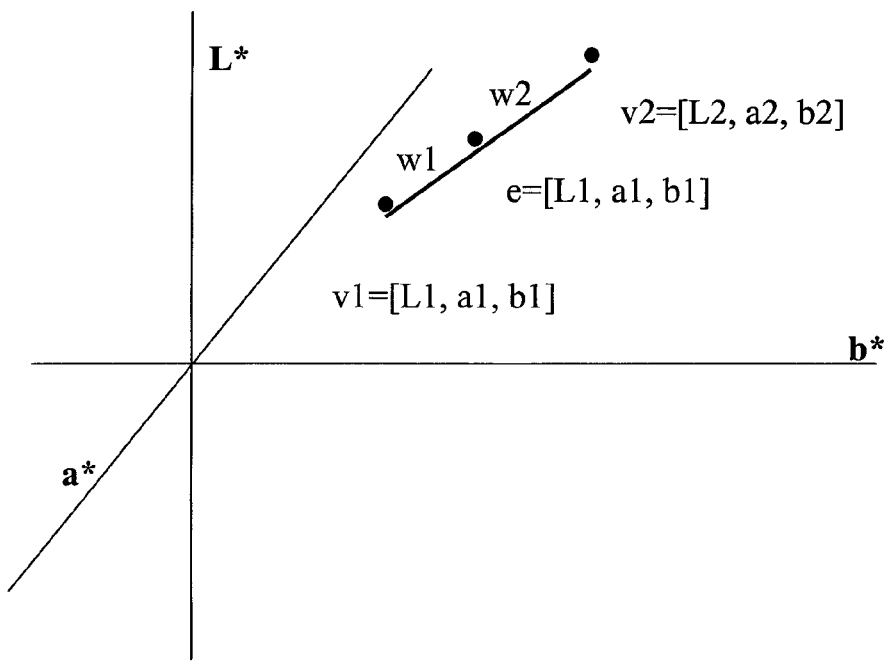
FIG. 10 depicts a linear interpolation process along the line segment connecting v1 and v2, at a point e produced by the line slice in FIG. 9.

For each range space intersection point [e1, e2, e3, e4] determined in the hyperplane intersection process, a set of barycentric edge weights is calculated along the edge the point lay on that enables the transformation of the intersection point to corresponding domain space values using a linear interpolation process. The calculation of the edge weights [w1, w2] for any one of the intersection points (e) is shown schematically in FIG. 10. The line segment formed by points v1 and v2 is dissected into two smaller segments [v1, e] and [e, v2]. The interpolation weight (w1) associated with point v1 is given by the length of line segment [e,v2] divided by the length of the complete segment [v1,v2]. Likewise the weight (w2) for point v2 is given by the ratio of the lengths of line segments [v1, e] and [v1, v2]. Thus, a domain space value for point e is calculated as $$w1 = \frac{dist(e, v2)}{dist(v1, v2)}$$

$$w2 = \frac{dist(e, v1)}{dist(v1, v2)}$$

$$\begin{bmatrix} x1 \\ x2 \\ x3 \\ x4 \end{bmatrix}_e = w1 \cdot \begin{bmatrix} x1 \\ x2 \\ x3 \\ x4 \end{bmatrix}_{v1} + w2 \cdot \begin{bmatrix} x1 \\ x2 \\ x3 \\ x4 \end{bmatrix}_{v2}$$

where the dist( ) function computes the length of the line segment using a Euclidean space distance metric. The process of converting the edge intersection points from the m-dimensional range space to the n-dimensional domain space is referred to herein as a barycentric weighting and interpolation process.

Considering the case where the first hyperplane slicing process resulted in four intersection points [e1, e2, e3, e4], the domain space connectivity is determined by applying a Delaunay tessellation process. (The Delaunay tessellation process is well known in the art, and a description can be found in a computational geometry text such as Goodman and O'Rourke—Handbook of Computational Geometry, CRC Press, New York, 1997, pp.377-388.) In the domain space, these four edge points lie in a subspace of the full domain space. In order to tessellate these points using a Delaunay tessellation process, these points need to be rotated into their full rank subspace, or the Delaunay tessellation process will fail. To perform this rotation the coordinates of the four edge points can be arranged, column wise, to form a 4×4 matrix Q $$Q = \begin{bmatrix} \begin{bmatrix} x1 \\ x2 \\ x3 \\ x4 \end{bmatrix}_{e1} \begin{bmatrix} x1 \\ x2 \\ x3 \\ x4 \end{bmatrix}_{e2} \begin{bmatrix} x1 \\ x2 \\ x3 \\ x4 \end{bmatrix}_{e3} \begin{bmatrix} x1 \\ x2 \\ x3 \\ x4 \end{bmatrix}_{e4} \end{bmatrix}.$$

This matrix has a rank of three since the columns are not linearly independent. A QR factorization of Q provides a process to rotate the incomplete rank 4×4 matrix to a lower dimensional 3×4 full rank matrix. A description of the QR factorization process is given in Golub and Van Loan—Matrix Computations 3$^{rd}$ edition, Johns Hopkins University Press, Baltimore, Md., 1996, pp. 223-236. A Delaunay tessellation is performed on the lower dimensional full rank matrix to produce a connectivity list for the four edge points [e1, e2, e3, e4]. This connectivity defines a simplex or simplicial complex of the edge points in the domain space. This connectivity is applied to the range space points, i.e., the CIELAB intersection points. The process of fitting a Delaunay tessellation to a set of domain space points that lie in a subspace of the full dimensional domain space using a QR factorization is referred to herein as a QR factorization process.

Figure 11:
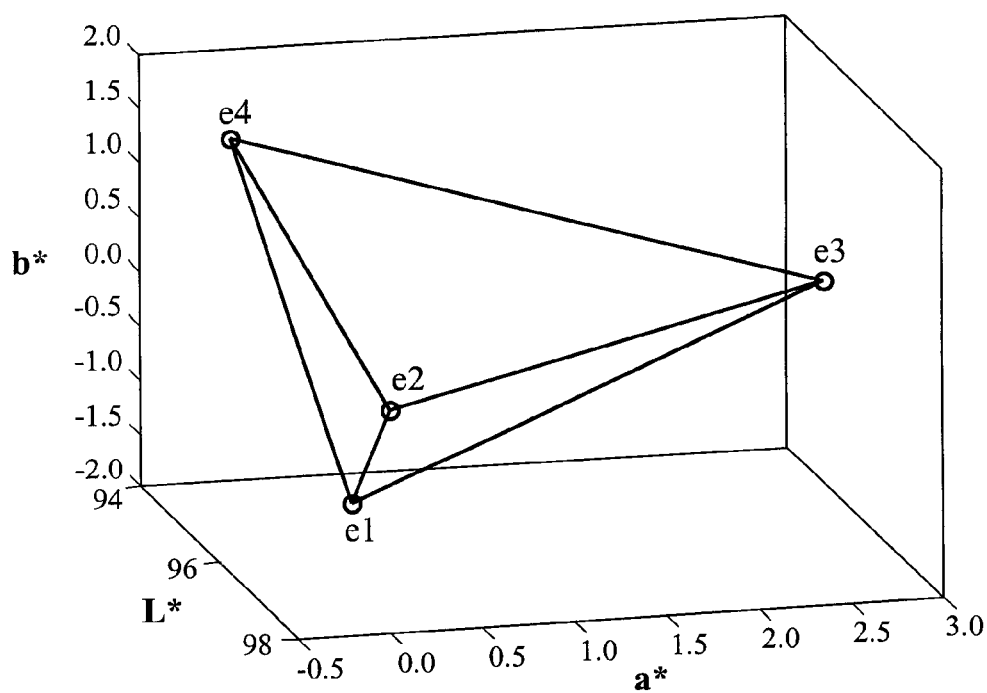
FIG. 11 is triangulation of the slice shown in FIG. 9.
Figure 12:
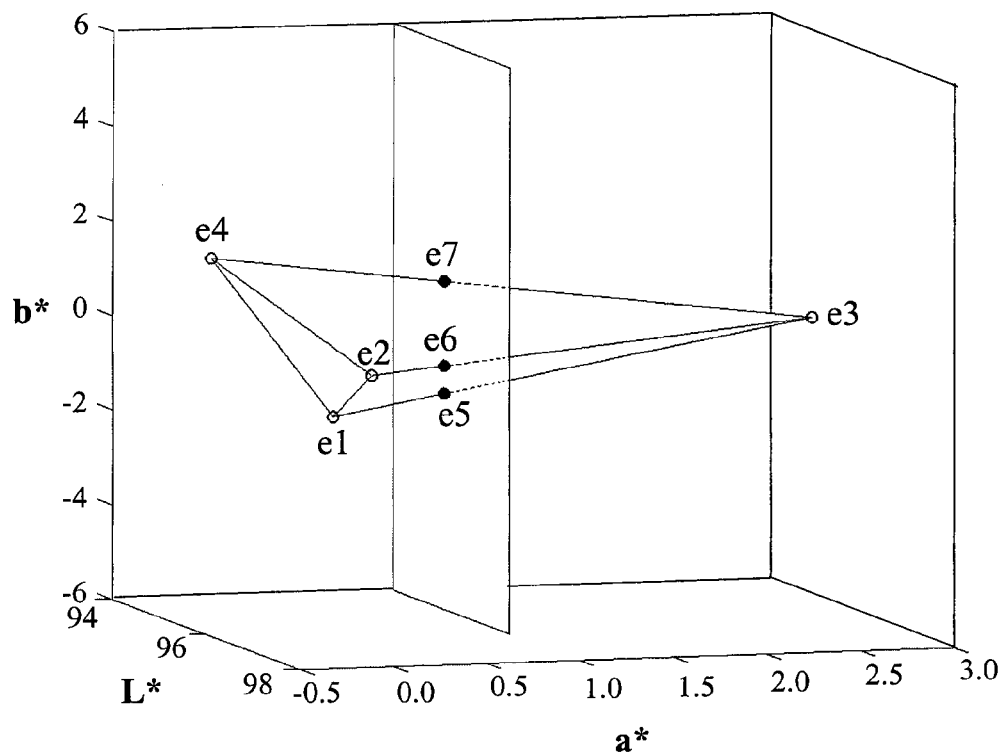
FIG. 12 depicts a slice through point P and the triangulation shown in FIG. 11.
Figure 13:
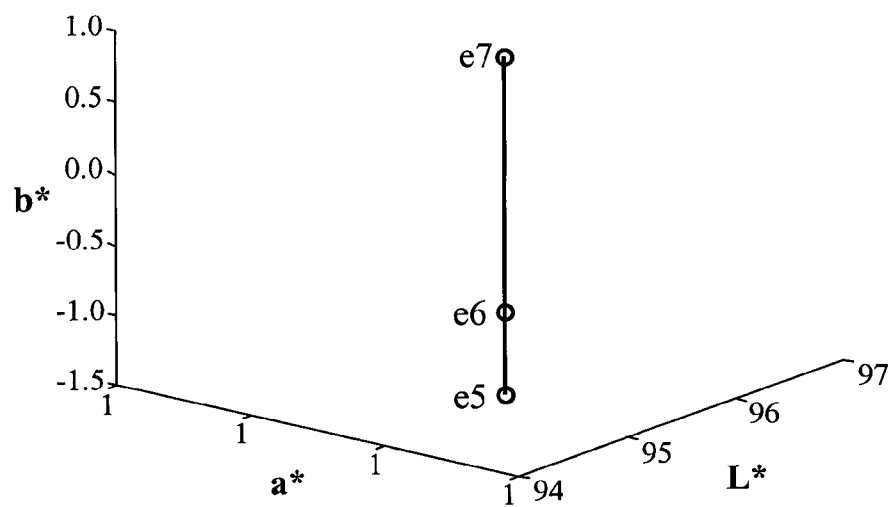
FIG. 13 depicts a triangulation of the slice shown in FIG. 12.
Figure 14:
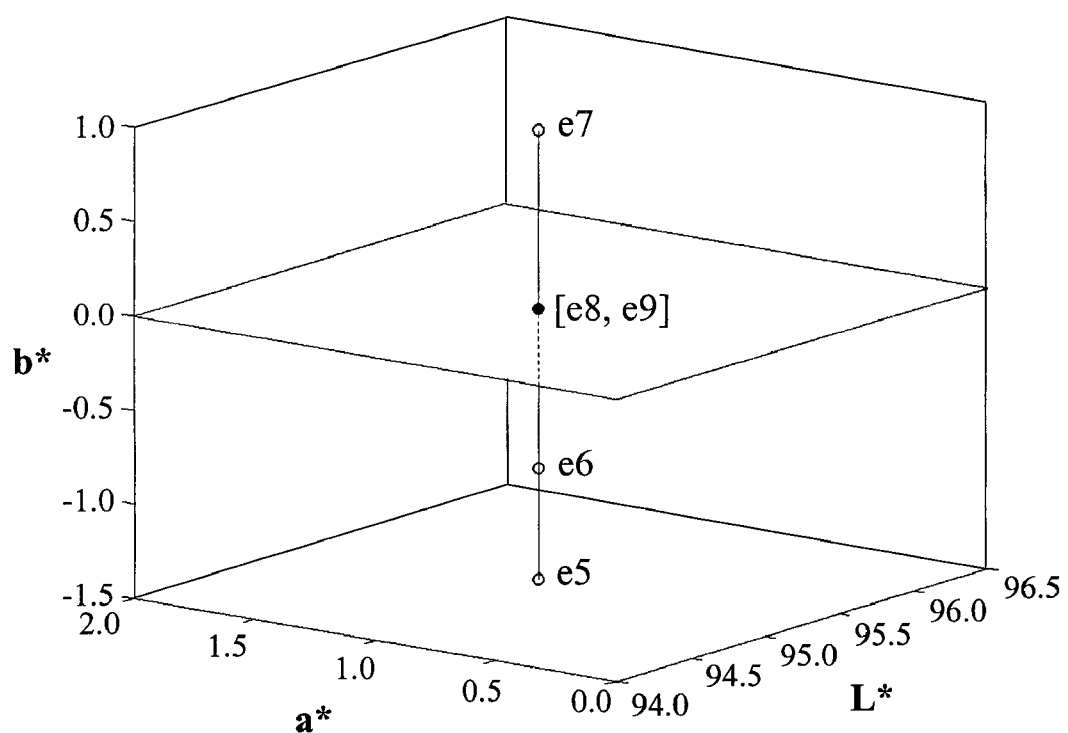
FIG. 14 depicts a slice taken through point P and the triangulation shown in FIG. 13.

The domain space simplicial complex that results from the first hyperplane slicing process is a first (n−1)-manifold in the colorant control signal space. The corresponding range of this manifold is shown in FIG. 11. Note that the vertices that comprise the simplicial complex shown in FIG. 11 have constant L* values consistent with the form of the first hyperplane. The goal of the hyperplane slicing process is to produce an (n−m) manifold for a point P in the range space. As such, m−1 additional hyperplane slicing processes need to be performed to produce the 1-manifold in the 4-dimensional colorant control signal domain space. Each of the hyperplane slicing processes results in a simplicial complex of order one less than the previous hyperplane slicing process. Referring to FIG. 12, the second hyperplane slice is obtained by computing the intersection of the second hyperplane with the first 3-manifold that was obtained from the first slicing process. In this example, the second slicing plane intersects three edges of the range of the first manifold resulting in 3 intersection points [e5, e6, e7]. These intersection points [e5, e6, e7] are tessellated resulting in a second 2-manifold whose range is shown in FIG. 13. The final slice is taken through the range of the second 2-manifold, as shown in FIG. 14, resulting in two coincident intersection points [e8, e9] resulting in a 1-manifold in the colorant control signal space.

The process of determining the intersection points, the corresponding domain space values, and the simplicial complex formed by the domain space intersection points is the same for each iteration of the hyperplane slicing process. After the m=3 hyperplane slicing processes have been applied, a 1-manifold will remain corresponding to the set of CMYK colorant control signals that map to the point P in CIELAB color space. This process is then repeated for all of the simplexes in the range space simplicial complex of the forward model.

As with the two colorant color printing device examples previously cited, some colorant control signal values will be preferable to others. A colorant selection process can be used to choose the preferred colorant control signal value from the set of all colorant control signals that map to a point P. The colorant selection process can account for various factors that can affect the desirability of different colorant control signal values. For example, for a four color inkjet-printing system, the colorant selection process could be based on the total fluid volume of the colorant combinations.

In a preferred embodiment of the present invention, a multidimensional cost function approach analogous to that described by Douglas W. Couwenhoven et al. in U.S. patent application Ser. No. 09/881,460 filed Jun. 14, 2001, the disclosure of which is herein incorporated by reference, can be used for the colorant selection process The multidimensional cost function can include terms for many cost attributes, relating to many different design characteristics. For example, using too much colorant can result in undesirable artifacts, as described earlier. Thus, for a CMYK printing device, the cost function can include a term that penalizes CMYK colorant control signal combinations using higher amounts of total ink volume. The ink volume is computed using an ink volume model, which predicts the ink volume as a function of the CMYK colorant control signal values. For many color printing devices, the ink volume model can be analytically expressed as an equation, given some knowledge about the specifications of the printer, such as the number of ink drop sizes that can be ejected at each pixel, and their associated volumes. For example, in the simple case of a binary CMYK color printing device with a fixed drop volume of 32 picoliters, the volume produced by a given CMYK colorant control signal combination will vary linearly with the sum of the CMYK colorant control signal values. However, state of the art inkjet printers can have highly nonlinear and/or non-monotonic ink volume curves as a function of the CMYK colorant control signal values. In general, the ink volume models can be stored as one-dimensional look-up tables (1-D LUTs) that relate colorant control signal values to ink volume. Ink volume models can be constructed for the C, M, Y, and K channels, and the total volume can be computed as the sum of the volumes of the individual CMYK channels according to $$V_{total}(C, M, Y, K) = VLUT_C(C) + VLUT_M(M) + VLUT_Y(Y) + VLUT_K(K).$$

Once the total ink volume has been computed, an ink volume cost metric $V_{cost}(C,M,Y,K)$ can be computed using a volume cost function. If the total volume is below a threshold or total colorant amount limit, $V_L$, then there is no cost associated with the corresponding CMYK colorant control signal combination. If the total volume exceeds the threshold $V_L$, then the volume cost increases rapidly. This will discourage the use of CMYK colorant control signal combinations that exceed the volume limit $V_L$, resulting in improved image quality.

Another cost attribute that can be important to include in a multidimensional cost function approach is related to the image noise that is produced by each candidate CMYK colorant control signal combination. As mentioned earlier, many CMYK colorant control signal combinations will result in the same output color value, but they will each use a different total ink volume and produce different printed halftone patterns that result in a different perception of "graininess" or "noise" when viewed by a human observer. According to the present invention, the noise associated with each CMYK colorant control signal combination can be used as a cost attribute to aid in the selection of a preferred CMYK colorant control signal combination to reproduce the desired output color value. Techniques for measuring the perception of noise in printed images are known in the art. Many similar variations exist that use a weighted sum of the image power spectrum as a measure of the noise in an image. In a preferred embodiment, the following equation is used to calculate the amount of noise in an image $$N = \log\left(\frac{1}{(n_x n_y)} \sum_u \sum_v |I(u, v) CSF(u, v)|^2\right)$$

where $(n_x, n_y)$ are the dimensions of the image region, $I(u,v)$ is the 2D Fourier transform of an image region $I(x,y)$, and $CSF(u,v)$ is the contrast sensitivity function of the human visual system, which can be computed according to the equations described in U.S. Pat. No. 5,822,451. The image region $I(x,y)$ corresponds to the halftone patterns that result from printing a given CMYK colorant control signal combination. An image noise model $N(C, M, Y, K)$ is then produced using the above equation to compute an image noise metric for a set of printed color patches substantially covering the full CMYK colorant control signal range. In fact, the same set of color patches can be used to develop the device model and noise model, although this is not necessarily the case. Once the noise model $N(C, M, Y, K)$ has been produced, an image noise cost can be computed for each of the candidate CMYK colorant control signal combinations according to $$N_{cost}(C,M,Y,K) = N(C,M,Y,K).$$

In addition to an ink volume metric and an image noise metric, the multidimensional cost function can also include other quality attributes such as a lightfastness metric, a waterfastness metric, a gloss metric, a color inconstancy index, or a metameric index, or combinations thereof. For example, certain CMYK colorant control signal combinations can provide improved resistance to light fading (or "lightfastness") when compared to other CMYK colorant control signal combinations. Thus, a lightfastness metric can be added to the cost function to penalize CMYK colorant control signal combinations that are prone to fading, thereby discouraging their use. Another term that can optionally be used in the cost function is a waterfastness metric cost attribute related to "waterfastness", or the resistance of a CMYK colorant control signal combination to smearing when wetted. Also, certain CMYK colorant control signal combinations can provide for accurate color matching under a wide variety of illuminants, while others can only provide an accurate color match to the desired output color under a specific illuminant. This property is called the "metameric index" of the CMYK colorant control signal combination, and more robust CMYK colorant control signal combinations can be assigned a lower cost than less robust ones.

Another term that can be used in the cost function relates to the surface gloss produced by a CMYK colorant control signal combination. For example, some inkjet printers use different formulations for the K ink than are used for the CMY inks. The different formulations can have different gloss properties, causing an abrupt gloss change, or "differential gloss", when printing smooth gradations. These gloss changes are undesirable, and thus CMYK colorant control signal combinations prone to differential gloss can be penalized via a gloss metric cost function term. One example of this would be to produce a cost attribute in which the cost increases with the amount of black (K) ink used. One skilled in the art will recognize that there are other cost attributes that can be used, depending on the specific requirements of the application.

Once all of the cost attributes have been computed, the total cost for a CMYK colorant control signal combination is computed by summing up all of the terms in the cost function. For example, consider the case where the total cost includes a volume cost term and an image noise cost term. The total cost is determined according to $$\text{Cost}(C,M,Y,K) = \alpha V_{cost}(C,M,Y,K) + \beta N_{cost}(C,M,Y,K)$$

where the weights $\alpha$, $\beta$ can be adjusted to indicate the relative importance of volume and noise in the image. Thus, the preferred CMYK colorant control signal combination to reproduce a desired output color is chosen as the one that reduces the cost function.

The 1-manifold calculated in the four colorant inversion process shown above is represented by a set of vertices and a tessellation or connectivity list that describes how the points are connected. One method for finding the colorant control signal value that corresponds to the minimum cost on the 1-manifold is to calculate the cost associated with each vertex in the manifold and select the vertex that results in the smallest cost. Another approach to finding the minimum cost along the manifold would be to fit the manifold with a continuous function such as a polynomial or spline and solve for the point that reduces the function.

Figure 15A:
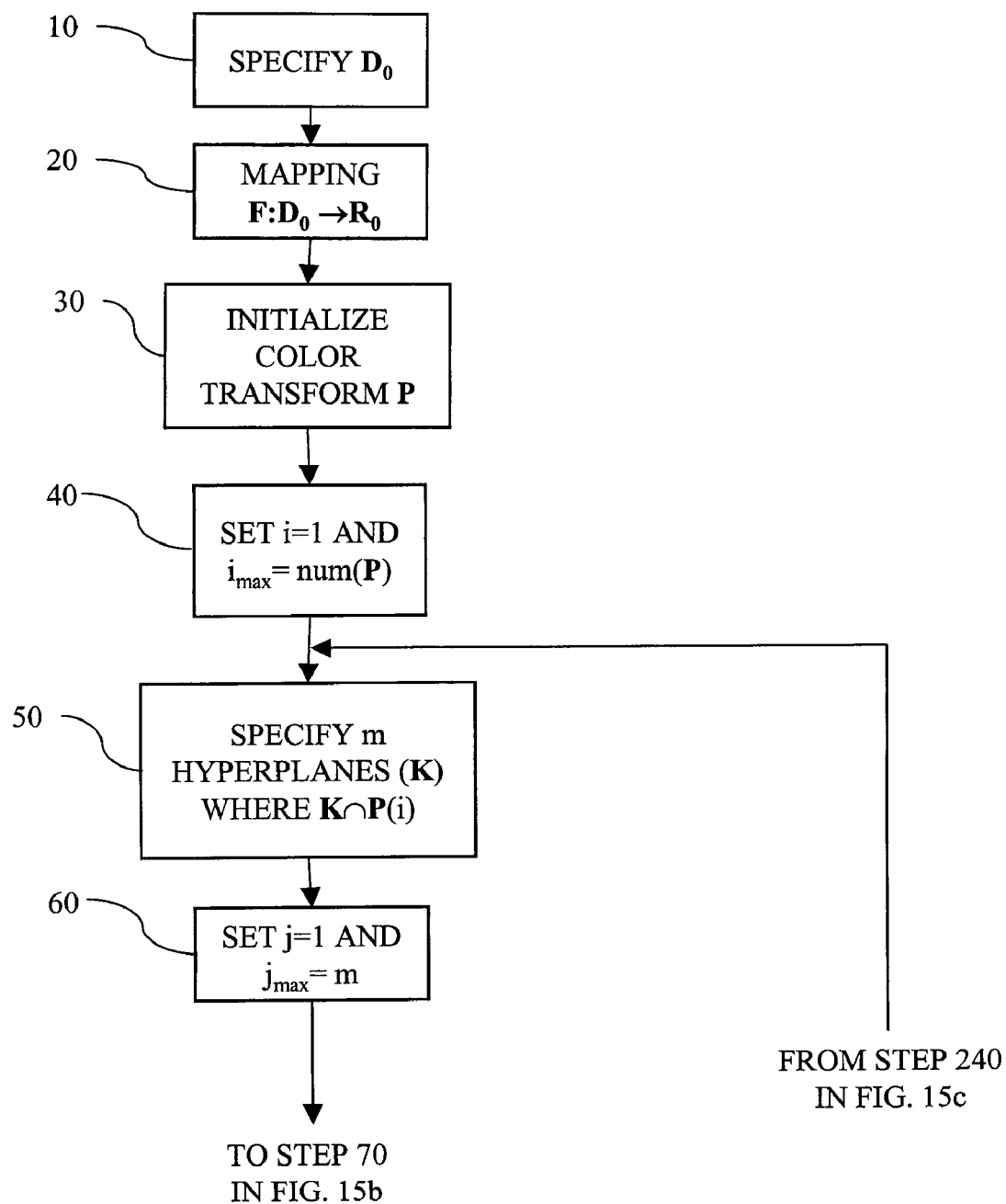
FIGS. 15A, 15B, and 15C, when laid out one above the other, depict a flow chart of the present invention.
Figure 15B:
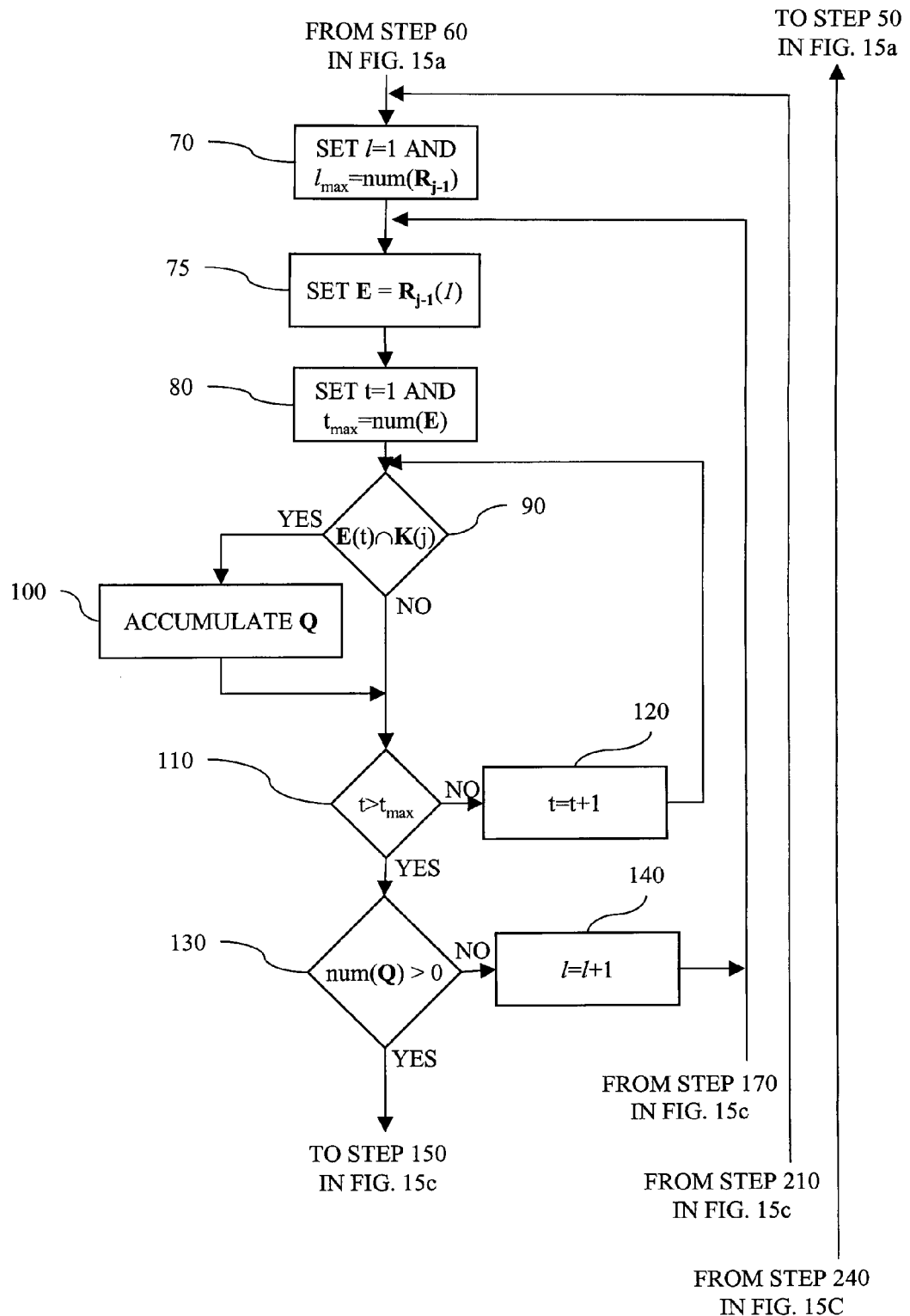
Figure 15C:
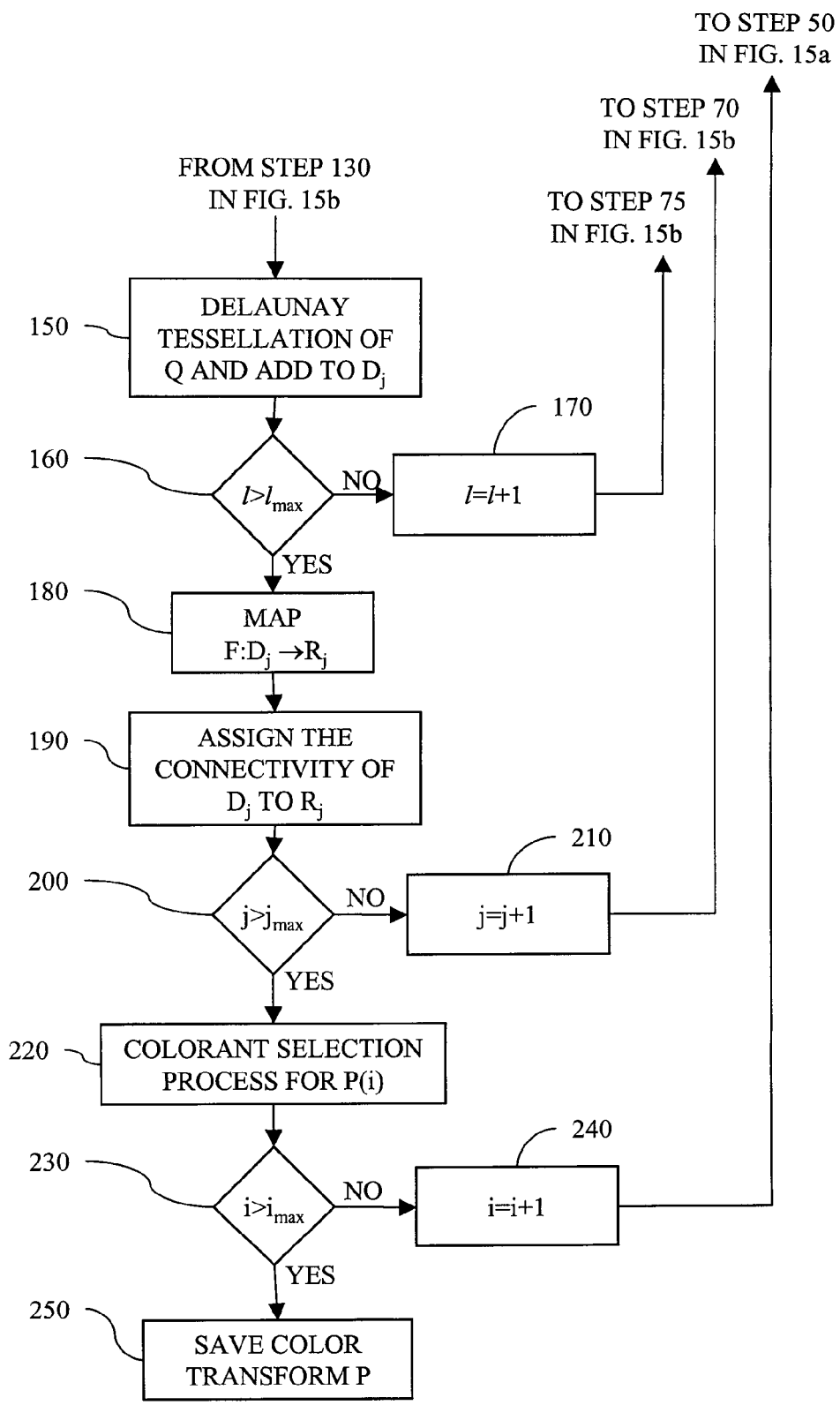

The present invention provides a method for computing an inverse device model for a color printing device by performing the above described inversion process for a set of nodes for an interpolation model in an m-dimensional color space by determining n-dimensional colorant control space signal for each node in the interpolation model. These points can be represented by set P in the CIELAB color space that are points in the inverse device model ($F^{-1}$). (Note: P (bold) refers to a set of points while P refers to a single point in the set.) Referring to FIG. 15A, FIG. 15B, and FIG. 15C, a flow chart is given describing a process that can be used to produce an inverse model ($F^{-1}$) that converts m-dimensional color space values (e.g., CIELAB values) to n-dimensional colorant control signal values (e.g., CMYK) according to the method of the present invention. Note that the flowchart begins on FIG. 15A and is continued on FIG. 15B and FIG. 15C. The arrows that connect the steps from the different pieces of the flow chart are labeled to indicate the appropriate connections between the figures. The flowchart for the entire method of computing an inverse device model for a color printing device can be viewed by lining up the flowcharts from FIG. 15A, FIG. 15B, and FIG. 15C at these connection points.

Referring first to FIG. 15A, a specify $D_0$ step 10 is used to specify an initial n-dimensional simplicial complex $D_0$ of a colorant control signal space (i.e., the CMYK colorant control signal domain). Next, a map $D_0$ step 20 is used to map the vertices of $D_0$ into an m-dimensional color space using a forward device model F to produce the range of $D_0$, denoted by $R_0$. (Note: $R_0$ is a simplicial complex that contains the same connectivity as $D_0$.) In shorthand notation the process of mapping the set of points in $D_0$ through the forward model F to produce $R_0$ is given by F:$D_0 \rightarrow R_0$.

Next, an initialize color transform P step 30 defines a set of m-dimensional color space values P that are node points of an m-to-n dimensional look-up table. As part of this step, a gamut mapping process is applied to any points in P that fall outside of $R_0$. The process of gamut mapping is defined herein as a process that maps any input point in P that falls out side the range $R_0$ of the forward device model F to a modified input point inside the range $R_0$ of the forward device model. F. Gamut mapping processes are well known to one skilled in the art and are integral to building inverse device models such as the one considered in this invention.

An initialization i step 40 is now applied setting a variable i=1 and a variable $i_{max}$=num(P). The function num( ) function determines the number of elements in the set. In this case $i_{max}$ equals the number of color space points in set P. The variable i is used as a looping variable and the variable $i_{max}$ is used as termination criterion for the i loop. The i loop is used to iterate over the points in P.

Next, a specify m hyperplanes step 50 is applied to define m hyperplanes (represented by K) in the m-dimensional color space whose only common point of intersection (represented by the ∩ symbol) is at the color space value of point P(i) where none of the m hyperplanes are cohyperplanar.

An initializate j step 60 is now applied setting a variable j=1 and a variable $j_{max}$=m. The variable j is used as a looping variable and the variable $j_{max}$ is used as termination criterion for the j loop. The j loop is used to iterate over each hyperplane in K.

Turning now to FIG. 15B, an initialize l step 70 is now applied setting variables l=1 and $l_{max}$=num($R_{j-1}$). Thus, $l_{max}$ is set to the number of points in the (j-1)$^{th}$ range space simplicial complex of R. The variable l is used as a looping variable and the variable $l_{max}$ is used as termination criterion for the l loop. The l loop is used to iterate over the simplexes in the $R_{j-1}$ simplicial complex.

Next, an initialize E step 75 is used to set the variable E equal to the $l^{th}$ simplex from the $R_{j-1}$ simplicial complex. The variable E contains the edges, the range space vertices (i.e., the m-dimensional color space values), the domain space vertices (i.e., the n-dimensional colorant control signal values), and the connectivity of the $l^{th}$ simplex of $R_{j-1}$.

Next, an initialize t step 80 is applied setting variables t=1, Q=NULL, and $t_{max}$=num(E). The variable t is used as a looping variable. The variable Q is used to store edge vertices and is set to be empty (i.e., NULL) at this step. The variable $t_{max}$ is used as termination criterion for the t loop. The t loop is used to iterate over the edges of the simplex stored in E.

A test edge step 90 is now used to test whether edge E(t) intersects the $j^{th}$ hyperplane of K. If E(t) intersects K(i) then the process proceeds to an accumulate vertices step 100, otherwise the process proceeds to a compare t step 110. The accumulate vertices step 100 adds any intersection points to the set of edge vertices stored in Q. The edge vertices Q(t) are the n-dimensional colorant control signal points that corresponds to the intersection of edge E(t) and hyperplane $K_j$, and can be determined using the barycentric weighting and interpolation process described earlier.

Next, the compare t step 110 is used to compare the value of t to $t_{max}$. If t is greater than $t_{max}$ the process proceeds to a check num(Q) step 130, otherwise the process proceeds to an increment t step 120, which sets t=t+1 then returns to the test edge step 90.

The check num(Q) step 130 compares num(Q) (i.e., the number of elements in set Q) to zero. If num(Q)>0 then at least one intersection point was found and the process proceeds to a tessellation step 150. Otherwise, the process proceeds to an increment l step 140, which sets l=l+1 then returns to the initialize E step 75.

The tessellation step 150 produces a colorant control signal space simplicial complex $D_j$ with element simplex/simplicies being the Delaunay tessellation of Q which are determined using the QR factorization process described above.

Next, a compare l step 160 is used to compare the value of l to $l_{max}$. If l is greater than $l_{max}$ the process proceeds to a map $D_j$ step 180. Otherwise, the process proceeds to an increment l step 170 which sets l=l+1 then returns to the initialize E step 75.

The map $D_j$ step 180 maps the n-dimensional colorant control signal vertices of $D_j$ to a set of m-dimensional color space vertices $R_j$ using the forward device model F. Next, an assign connectivity step 190 is applied which assigns the connectivity of the n-dimensional colorant control signal space simplicial complex of $D_j$ to the m-dimensional color space simplicial complex $R_j$.

Next, a compare j step 200 is used to compare the value of j to $j_{max}$. If j is greater than $j_{max}$, then the process proceeds to a colorant selection process step 220. Otherwise, the process proceeds to an increment j step 210 that sets j=j+1 then returns to the initialize l step 70.

The colorant selection process step 220 is used to select an n-dimensional colorant control signal point (Z) from $D_j$ that corresponds to the m-dimensional color space point P(i) in the m-to-n dimensional inverse model ($F^{-1}$) using a colorant selection process. (Note that the simplicial complex $D_j$ represents the colorant control signal (n−m)-manifold for point P(i).) In a preferred embodiment of the present invention, the colorant selection process comprises the reduction of a multidimensional cost function over the manifold as described above.

Next, a compare i step 230 is used to compare the value of i to $i_{max}$. If i is greater than $i_{max}$ then the process proceeds to a save color transform step 250. Otherwise, the process proceeds to an increment i step 240, which sets i=i+1 then returns to the specify m hyperplanes step 50.

Finally, the save color transform step 250 saves the inverse device model $F^{-1}$ as a color transform in a color management profile or in a form suitable for incorporation into an image processing chain of algorithms.

Once the inverse device model $F^{-1}$ has been produced, it can be used to populate the fields in a color management profile such as that defined by the ICC. This color management profile can then be used in a color printing device that has as its inputs image code values encoded in the m-dimensional color space. A processing unit, e.g. computer software or hardware, converts the image code values to colorant control signal values using the m-to-n dimensional inverse device model ($F^{-1}$) that is stored in the color management profile. The colorant control signal values are then sent to the color printing device to produce a high quality color-managed print.

In another example, the m-to-n dimensional inverse device model is stored in the memory of a color printing device in the form of a multidimensional look-up table. In this case, the image code values that are encoded in the m-dimensional color space and printer hardware converts them to colorant control signal values using the m-to-n multidimensional look-up table. The colorant control signal values are then sent to the color printing device to produce a high quality color-managed print.

In a third example, the m-to-n dimensional inverse device model is stored in a color management profile and is used in an image processing chain to process an image whose code values are in an input color space other than the m-dimensional color space of the m-to-n dimensional inverse device model. The image processing chain then performs a conversion from the input color space to the m-dimensional color space. The converted image code values are then further converted to colorant control signal values using the m-to-n dimensional inverse device model. The colorant control signal values are then sent to the color-printing device to produce a high quality color-managed print. In this case, it can be desirable to combine the transform for converting from the input color space to the m-dimensional color space with the m-to-n dimensional inverse device model to form a single color transform that can be applied to the input image code values rather than applying two sequential color transforms.

The previous three examples are not an exhaustive list of use-case for which the m-to-n dimensional inverse device model can be used to produce color-managed prints. The examples are given for illustration purposes only, realizing other scenarios exist for using this type of inverse device model.

In one embodiment of the present invention, the colorants used in the color printing device include cyan, magenta, yellow, and black. In another embodiment of the present invention, the n colorants include additional colorants having hues substantially different from cyan, magenta, and yellow. Such additional colorants can be used to increase the color gamut of the color printing device. Examples of such extra colorants would include orange and green colorants, or red, green, and blue colorants.

In another embodiment of the present invention, the colorants used in the color printing device include at least 2 colorants having the same color but different densities. For example, the colorants could include a light cyan ink and a dark cyan ink. Similarly, the colorants could include multiple gray inks having different densities.

In one embodiment of the present invention, the n colorants correspond to n primary light sources for an n-channel color display device such as an organic light emitting diode display, a micro mirror display, or liquid crystal display. For example, an n-channel color display device can utilize red, green, blue, and white primaries. For these systems a multidimensional cost function used in the colorant selection process might include terms associated with a display primaries usage, display power consumption, display brightness, or display lifetime, or combinations thereof. Tradeoffs between these attributes can be made using a multidimensional cost function to impact the display's average power consumption, the display projected life time before the luminous output of the display primaries drop below a critical level, etc.

In general, the present invention can be used to produce an inverse device model for any color imaging system that utilizes any set(s) of n colorants and/or light sources.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

10 specify $D_0$ step
20 map $D_0$ step
30 initialize color transform P step
40 initialization i step
50 specify m hyperplanes step
60 initializate j step
70 initialize l step
75 initialize E step
80 initialize t step
90 test edge step
100 accumulate vertices step
110 compare t step
120 increment t step
130 check num(Q) step
140 increment l step
150 tessellation step
160 compare l step
170 increment l step
180 map $D_j$ step
190 assign connectivity step 200 compare j step
210 increment j step
220 colorant selection process step
230 compare i step
240 increment i step
250 save color transform step

The invention claimed is:

1. A method for determining a set of n-dimensional colorant control signals that map to a point P in an m-dimensional color space where n>m, comprising:
    a) determining a forward device model that maps n-dimensional colorant control signals to m-dimensional color space signals in the m-dimensional color space;
    b) determining a set of n-dimensional colorant control signal simplexes that span a domain of the forward device model;
    c) determining a set of range space simplexes in the m-dimensional color space corresponding to the set of n-dimensional colorant control space signal simplexes by mapping the vertices of the n-dimensional colorant control signal simplexes into the m-dimensional color space using the forward device model;
    d) specifying a point P in the m-dimensional color space; and
    e) determining the set of n-dimensional colorant control signals that map to the point P in the m-dimensional color space, by performing m sequential slicing processes through the set of range space simplexes.

2. The method according to claim 1 wherein the set of n-dimensional colorant control signals that map to the point P are defined by a set of (n−m) dimensional colorant control signal space simplexes.

3. The method according to claim 1 where the sequential slicing process in step e) includes sequentially slicing through the set of range space simplexes with m surfaces whose only common point of intersection is at the point P.

4. The method according to claim 1 where the n colorants include cyan, magenta, yellow, and black colorants.

5. The method according to claim 4 where the n colorants further include additional colorants having hues substantially different from cyan, magenta, and yellow.

6. The method according to claim 1 where the n colorants include at least 2 colorants having the same color but different densities.

7. The method according to claim 1 where the n colorants correspond to n inks used by a color printing device.

8. The method according to claim 1 where the n colorants correspond to n primary light sources for an n-channel color display device.

9. The method according to claim 1 further including using a cost function to select an n-dimensional colorant control signal from the set of n-dimensional colorant control signals that map to the point P.

10. The method according claim 9 where the cost function includes cost terms associated with an image noise metric, an ink volume cost metric, a lightfastness metric, a waterfastness metric, a gloss metric, a color inconstancy index or a metameric index, or combinations thereof.

11. The method according to claim 9 wherein the cost function includes cost terms associated with a display primaries usage, display power consumption, display brightness, or display lifetime, or combinations thereof.

12. A method for producing an inverse device model for a color printing device that comprises:
    a) defining a set of nodes for an interpolation model in an m-dimensional color space;
    b) producing an inverse device model by determining a corresponding n-dimensional colorant control space signal for each node in the interpolation model using the method according to claim 9.

13. The method according to claim 12 where the inverse device model is used to produce a color management profile for a color printing device or a color display device.

14. The method according to claim 12 where the inverse device model is used to produce a multidimensional color look-up table that is used in an image processing chain for a color printing device or a color display device.

15. The method according to claim 1 further including a gamut mapping step that maps any input point that falls outside the range of the forward device model to a modified input point inside the range of the forward device model.

* * * * *